(12) United States Patent
LeBlanc

(10) Patent No.: US 10,330,827 B2
(45) Date of Patent: Jun. 25, 2019

(54) METHOD AND SYSTEM FOR DISPLAYING WEATHER INFORMATION ON A TIMELINE

(71) Applicant: Sky Motion Research, ULC, Montreal (CA)

(72) Inventor: André LeBlanc, Mont-Royal (CA)

(73) Assignee: SKY MOTION RESEARCH, ULC, Montreal (CA)

( * ) Notice: Subject to any disclaimer, the term of this patent is extended or adjusted under 35 U.S.C. 154(b) by 531 days.

(21) Appl. No.: 14/244,383

(22) Filed: Apr. 3, 2014

(65) Prior Publication Data

US 2015/0006079 A1 Jan. 1, 2015

Related U.S. Application Data

(60) Provisional application No. 61/839,675, filed on Jun. 26, 2013.

(51) Int. Cl.
*G01W 1/00* (2006.01)
*G01W 1/10* (2006.01)

(52) U.S. Cl.
CPC ........ *G01W 1/10* (2013.01); *G01W 2001/006* (2013.01); *Y02A 90/14* (2018.01)

(58) Field of Classification Search
CPC ............ G06F 3/04847; G06F 3/04817; G06F 3/0482; G06F 3/04842; G06F 3/0488;
(Continued)

(56) References Cited

U.S. PATENT DOCUMENTS 5,406,481 A 4/1995 Shinozawa et al.
5,574,647 A 11/1996 Liden
(Continued)

FOREIGN PATENT DOCUMENTS

CA 2514868 8/2004
CN 1481512 A 3/2004
(Continued)

OTHER PUBLICATIONS

LeBlanc U.S. Advisory Action mailed Nov. 25, 2015, directed to U.S. Appl. No. 13/922,800; 4 pages.
(Continued)

*Primary Examiner* — Roy Y Yi
(74) *Attorney, Agent, or Firm* — Blank Rome LLP

(57) ABSTRACT

Provided are methods, devices, and non-transitory computer readable storage mediums to generate a weather timeline such as a succession of weather information on a continuous time scale. For example, a timeline may include first weather information associated with a first time in a first territorial location, second weather information associated with a second time, and third weather information associated with a third time. At least one of the first, second and third weather information may comprise a forecasted weather value indicative of a probability of having a specific type of precipitation at a specific intensity. A weather timeline may follow a specific location (e.g. city, town, any region with a definite boundary), a specific weather event (e.g. a specific precipitation type, a specific temperature level, a specific wind intensity), and/or a specific user. A timeline may include data created by an observer of the related weather information, where the data may be at least one of a picture, a video or a comment inputted by the observer about the related weather information.

22 Claims, 10 Drawing Sheets

(58) Field of Classification Search
CPC .......................... G06F 3/017; G06F 3/04845;
G06F 3/04883; G06F 17/30867; G06F
17/3053; G06F 3/0362; G06F 3/0416;
G06F 3/0485; G06F 9/4443
See application file for complete search history.

(56) References Cited

U.S. PATENT DOCUMENTS

| | | |
|---|---|---|
| 5,974,360 A | 10/1999 | Otsuka et al. |
| 6,128,578 A | 10/2000 | Sakaino et al. |
| 6,201,494 B1 | 3/2001 | Kronfeld |
| 6,298,307 B1 | 10/2001 | Murphy et al. |
| 6,317,686 B1 | 11/2001 | Ran |
| 6,360,172 B1 | 3/2002 | Burfeind et al. |
| 6,496,780 B1 | 12/2002 | Harris et al. |
| 6,501,392 B2 | 12/2002 | Gremmert et al. |
| 6,535,817 B1 | 3/2003 | Krishnamurti |
| 6,542,825 B2 | 4/2003 | Jones |
| 6,581,009 B1 | 6/2003 | Smith |
| 6,590,529 B2 | 7/2003 | Schwoegler |
| 6,850,184 B1 | 2/2005 | Desrochers et al. |
| 6,920,233 B2 | 7/2005 | Wolfson et al. |
| 6,961,061 B1 * | 11/2005 | Johnson ............... G06T 15/503 345/473 |
| 6,980,908 B2 | 12/2005 | McKewon et al. |
| 6,985,837 B2 | 1/2006 | Moon et al. |
| 7,043,368 B1 | 5/2006 | Cote et al. |
| 7,062,066 B2 | 6/2006 | Wolfson et al. |
| 7,069,258 B1 | 6/2006 | Bothwell |
| 7,082,382 B1 | 7/2006 | Rose |
| 7,181,345 B2 | 2/2007 | Rosenfeld et al. |
| 7,231,300 B1 | 6/2007 | Rose, Jr. |
| 7,231,309 B2 | 6/2007 | Yeh et al. |
| 7,321,827 B1 | 1/2008 | Myers et al. |
| 7,379,817 B1 | 5/2008 | Tyson |
| 7,391,358 B2 | 6/2008 | Dupree et al. |
| 7,421,344 B1 | 9/2008 | Marsh et al. |
| 7,472,021 B2 | 12/2008 | Bieringer et al. |
| 7,486,220 B1 | 2/2009 | Kronfeld et al. |
| 7,515,088 B1 | 4/2009 | Woodell |
| 7,542,852 B1 | 6/2009 | Rose et al. |
| 7,558,674 B1 | 7/2009 | Neilley et al. |
| 8,280,633 B1 | 10/2012 | Eldering |
| 8,332,084 B1 | 12/2012 | Bailey et al. |
| 2001/0030624 A1 | 10/2001 | Schwoegler |
| 2001/0049584 A1 | 12/2001 | Jones et al. |
| 2002/0038353 A1 | 3/2002 | Yamamoto |
| 2002/0114517 A1 | 8/2002 | Wolfson |
| 2003/0035860 A1 | 2/2003 | Ando et al. |
| 2003/0193411 A1 | 10/2003 | Price |
| 2004/0010372 A1 | 1/2004 | Schwoegler |
| 2004/0043760 A1 | 3/2004 | Rosenfeld et al. |
| 2004/0143396 A1 | 7/2004 | Allen |
| 2004/0215483 A1 | 10/2004 | Fixman |
| 2005/0197774 A1 | 9/2005 | Egi |
| 2005/0222770 A1 | 10/2005 | McKewon et al. |
| 2006/0015254 A1 | 1/2006 | Smith |
| 2006/0271297 A1 | 11/2006 | Repelli et al. |
| 2006/0287818 A1 | 12/2006 | Okude et al. |
| 2007/0069941 A1 | 3/2007 | Pearlman et al. |
| 2007/0112476 A1 | 5/2007 | Obradovich |
| 2007/0256716 A1 | 11/2007 | Resner |
| 2008/0097701 A1 | 4/2008 | Zawadzki et al. |
| 2008/0201647 A1 | 8/2008 | Lagerstedt |
| 2008/0313037 A1 | 12/2008 | Root et al. |
| 2009/0037100 A1 | 2/2009 | Fujiwara |
| 2009/0088965 A1 | 4/2009 | Burckart et al. |
| 2009/0157294 A1 | 6/2009 | Geelen |
| 2009/0157298 A1 | 6/2009 | Kon |
| 2009/0210353 A1 | 8/2009 | Mitchell et al. |
| 2010/0250581 A1 | 9/2010 | Chau |
| 2011/0054776 A1 | 3/2011 | Petrov |
| 2011/0267224 A1 | 11/2011 | Venkatachalam et al. |
| 2011/0307168 A1 | 12/2011 | Kieff |
| 2012/0147030 A1 | 6/2012 | Hankers et al. |
| 2012/0170030 A1 | 7/2012 | Mihajlovic et al. |
| 2013/0013206 A1 | 1/2013 | Guha et al. |
| 2013/0035860 A1 | 2/2013 | Guha et al. |
| 2013/0046459 A1 | 2/2013 | Itakura |
| 2014/0067270 A1 | 3/2014 | Gail |
| 2014/0303893 A1 | 10/2014 | LeBlanc |
| 2014/0368361 A1 | 12/2014 | Leblanc |
| 2014/0372038 A1 | 12/2014 | LeBlanc |
| 2014/0372039 A1 | 12/2014 | LeBlanc |
| 2014/0379264 A1 | 12/2014 | LeBlanc |
| 2015/0006079 A1 | 1/2015 | Leblanc |

FOREIGN PATENT DOCUMENTS

| | | |
|---|---|---|
| CN | 101349767 A | 1/2009 |
| CN | 102169194 A | 8/2011 |
| CN | 102809767 A | 12/2012 |
| EP | 1218698 | 7/2002 |
| EP | 1566665 A1 | 8/2005 |
| EP | 2415044 A1 | 2/2012 |
| JP | H05-307080 | 11/1993 |
| JP | H08261854 A | 10/1996 |
| JP | H09096679 A | 4/1997 |
| JP | H11-2539 A | 1/1999 |
| JP | 11-136365 | 5/1999 |
| JP | H11-014760 A | 5/1999 |
| JP | H11242080 A | 9/1999 |
| JP | 2000193469 A | 7/2000 |
| JP | 2000258174 A | 9/2000 |
| JP | 2001-081711 A | 3/2001 |
| JP | 200258174 A | 2/2002 |
| JP | 2002099576 A | 4/2002 |
| JP | 2002148061 A | 5/2002 |
| JP | 2002357670 A | 12/2002 |
| JP | 2003030421 A | 1/2003 |
| JP | 2003121172 A | 4/2003 |
| JP | 2003216752 A | 7/2003 |
| JP | 2003300176 A | 10/2003 |
| JP | 2004-028625 A | 1/2004 |
| JP | 2004069478 A | 3/2004 |
| JP | 2004170201 A | 6/2004 |
| JP | 2004516462 A | 6/2004 |
| JP | 2004184224 A | 7/2004 |
| JP | 2005203173 A | 7/2005 |
| JP | 2005-300176 | 10/2005 |
| JP | 2005-316886 A | 11/2005 |
| JP | 2006197106 A | 7/2006 |
| JP | 2006337182 A | 12/2006 |
| JP | 2007047034 A | 2/2007 |
| JP | 2007-163442 A | 6/2007 |
| JP | 2008008776 A | 1/2008 |
| JP | 2008157919 A | 7/2008 |
| JP | 2008203173 A | 9/2008 |
| JP | 2009-025083 A | 2/2009 |
| JP | 2009-108456 A | 5/2009 |
| JP | 2009230720 | 10/2009 |
| JP | 2010060444 A | 3/2010 |
| JP | 2010521020 A | 6/2010 |
| JP | 2010-164557 A | 7/2010 |
| JP | 2011257149 A | 12/2011 |
| JP | 2012052930 A | 3/2012 |
| JP | 2012126384 A | 7/2012 |
| JP | 05307080 B2 | 10/2013 |
| TW | 200506410 | 2/2005 |
| TW | 201209441 A | 3/2012 |
| TW | 201224502 A | 6/2012 |
| TW | 201231920 A | 8/2012 |
| WO | WO-01/25727 A1 | 4/2001 |
| WO | WO-02/23462 | 3/2002 |
| WO | WO-0249310 A2 | 6/2002 |
| WO | WO-2012062760 A1 | 5/2012 |
| WO | WO-2012/089280 A1 | 7/2012 |

(56) References Cited

FOREIGN PATENT DOCUMENTS

WO  WO-2014/161079 A1  10/2014
WO  WO-20140161077 A1  10/2014

OTHER PUBLICATIONS

Leblanc, A., U.S. Office Action mailed Jan. 7, 2015, directed to U.S. Appl. No. 13/922,800; 16 pages.
LeBlanc, U.S. Appl. No. 13/922,800, filed Jun. 20, 2013, 34 pages.
LeBlanc, U.S. Appl. No. 13/947,331, filed Jul. 22, 2013, 35 pages.
LeBlanc, U.S. Appl. No. 13/856,923, filed Apr. 4, 2013, 39 pages.
LeBlanc, U.S. Appl. No. 14/244,516, filed Apr. 3, 2014, 44 pages.
LeBlanc, U.S. Appl. No. 14/244,586, filed Apr. 3, 2014, 40 pages.
Qhtani, A., (Feb. 25, 2012) "WeatherSpark," located at <https://www.youtube.com/watch?v=6LZjaweaXyc> visited on Jun. 18, 2014. (1 page).
Press release. (Oct. 26, 2012) "New AccuWeather App for Windows 8 Takes Users on a Journey," located at <http://www.accuweather.com/en/press/699373>. (3 pages).
Wikipedia.org. (Mar. 12, 2013) "Weather forecasting," located at <https://web.archive.org/web/20130312014022/http://en.wikipedia.org/wiki/Weather_forecasting>. (15 pages).
International Search Report and Written Opinion mailed Jul. 23, 2014, directed to International Application No. PCT/CA2014/000313; 9 pages.
International Search Report and Written Opinion mailed Jul. 24, 2014, directed to International Application No. PCT/CA2014/000330; 10 pages.
International Search Report and Written Opinion mailed Jul. 15, 2014, directed to International Application No. PCT/CA2014/000314; 8 pages.
International Search Report and Written Opinion mailed Jul. 21, 2014, directed to International Application No. PCT/CA2014/000333; 10 pages.
International Search Report and Written Opinion mailed Jul. 17, 2014, directed to International Application No. PCT/CA20014/000315; 8 pages.
International Search Report and Written Opinion mailed Jul. 11, 2014, directed to International Application No. PCT/CA2014/000317; 12 pages.
LeBlanc, Office Action mailed Aug. 7, 2015, directed to U.S. Appl. No. 13/922,800; 19 pages.
Appeal; US Court of Appeals for the Federal Circuit; *Electric Power Group, LLC* v. *Alstom S.A.*, Aug. 1, 2016; 12 pages.
C. F. Mass, "IFPS and the Future of the National Weather Servicer", Forcaster's Forum, American Meteorological Society, Feb. 2003, Nov. 11, 2002 and Dec. 2, 2002, pp. 75-79.
Wikipedia.org, "Weather forecasting", version published Mar. 12, 2013, retrieved from internet on Mar. 27, 2017 https://web.archive.org.web/20130312014022/http:en.wikipedia.org/wiki/Weather_forecasting>#.
Abdulrahman Qhtani, "Weather Spark" viewed on the internet on Mar. 31, 2017, https://www.youtube.com/watch?v=6LZjaweaXyc> Uploaded/Published Feb. 25, 2012 #.
Shen J., "Significance, Current Situation and Method of Weather Probability Forecast," Hubei Weather. No. 2, 1996.
Probability of Precipitation, Feb. 23, 2012, URL:<http://web.archive.org/web/20120223192309/https:/ja.wikipedia.org/wiki%E9%99%8dE6%B0%B4%E7%A2%BAE7%8E%87>.
Precipitation probability—Wikipedia, https://ja.wikipedia,org/wiki%E9%99%8D%E6%B0%B4%E7%A2%BA%E7%8e%87, retrieved Jun. 22, 2017.
EP Search Report Appln. No. 14778718.8, dated Nov. 25, 2016.
EP Search Report Appln. 14779873.0, dated Nov. 25, 2016.
EP Search Report Appln.14778742.8, dated Dec. 23, 2016.
EP Search Report Appln. 14779094.3, dated Aug. 12, 2016.

* cited by examiner

METHOD AND SYSTEM FOR DISPLAYING WEATHER INFORMATION ON A TIMELINE

CROSS-REFERENCE TO RELATED APPLICATIONS

This application claims priority to U.S. Provisional Application No. 61/839,675, filed on Jun. 26, 2013, and is related to co-owned and co-invented U.S. patent application Ser. No. 13/856,923, filed on Apr. 4, 2013, U.S. patent application Ser. No. 13/922,800, filed on Jun. 20, 2013, U.S. patent application Ser. No. 13/947,331, filed on Jul. 22, 2013, U.S. Provisional Application No. 61/835,626, filed on Jun. 16, 2013, and U.S. Provisional Application No. 61/836,713, filed on Jun. 19, 2013, the entire contents of which are hereby incorporated by reference.

BACKGROUND (a) Field

The subject matter disclosed generally relates to methods for producing weather forecasts. More specifically, the subject matter relates to software applications for producing weather forecasts.

(b) Related Prior Art

Conventional weather forecasting systems provide weather predictions twelve hours to a few days from the present time. If one needs a short-term forecast or a forecast with a fine time scale, the best information available is usually an hourly forecast for the day.

Conventional weather forecasts are average forecasts for the area for which they are generated. Thus, a forecast may be inaccurate for a precise location within this area, and even the present weather displayed for an area may differ from the actual weather for a precise location within this area.

Moreover, conventional weather forecasts are displayed on a time scale that is too coarse to allow a user to know when a weather event takes place in a precise location and time. Even for hourly conventional weather forecasts, it is impossible for the user to know if the forecasted weather event lasts one hour or one minute and, for the latter, at what time it takes place exactly within the hour.

Furthermore, weather forecasts may be inaccurate and there is no way to know it since there is no interaction with the users. Collaboration with the users is thus needed.

Therefore, there is a need in the market for the generation of short-term weather forecasts, and a convenient and collaborative way to display these weather forecasts is also needed.

SUMMARY

Provided herein are computer-implemented methods that may comprise the following: identifying first weather information associated with a first time and a first location; identifying second weather information associated with a second time; identifying third weather information associated with a third time; identifying observation data related to at least one of the first, second and third weather information; and generating a first timeline, for display on a display device, comprising information indicative of the first, second and third weather information.

In some embodiments, the first, second and third times may be different times. The first time may be a past time, the second time may be a current time, and the third time may be a future time.

In some embodiments, at least one of the first, second and third weather information may comprise a forecasted weather value indicative of a probability of having a first type of precipitation in the first location with a first intensity.

In some embodiments, the first, second and third weather information may be related to the first territorial location.

In some embodiments, the first, second and third weather information may be related to a first weather event.

In some embodiments, the first, second and third weather information may be related to a first user.

In some embodiments, the observation data may be at least one of a picture, a video, and a comment input by a user related to at least one of the first, second and third weather information.

In some embodiments, the method may further comprise generating a second timeline, for display on the display device with the first timeline, the second timeline comprising information indicative of weather information associated with a fourth time and a fifth time.

In some embodiments, the first timeline may be associated with the first location and the second timeline is associated with a second location different from the first location.

In some embodiments, the first timeline may be associated with a first weather event and the second timeline may be associated with a second weather event different from the first weather event.

In some embodiments, the first timeline may be associated with a first user and the second timeline may be associated with a second user different from the first user, and at least a portion of the observation data is received from the first and second users.

In some embodiments, the observation data is related to a weather event comprising at least one of a tornado, a hurricane, a hail cloud, a heavy rain, a heavy snow, a derecho, and a downburst.

Further, there may be a computer implemented method for displaying weather information to a user at a given time, the weather information relating to a given period and to a given territory, and including a succession of weather forecasts, past weather observations, present weather observations or a user input. The method may comprise: receiving the past weather observations or the present weather observations; using the past weather observations or the present weather observations for preparing forecasted weather values; using the forecasted weather values for generating the succession of weather forecasts starting after the given time and for subsequent times separated by a time increment; building a timeline displaying the weather information, the timeline covering the given period, the given period both preceding and succeeding to the given time; and receiving the user input that is added to the timeline.

In some embodiments, the step of receiving the user input may comprise receiving a picture, a video, a comment or a weather value.

In some embodiments, the step of receiving the user input may comprise receiving a picture, a video, a comment or a weather value relating to a weather event, the weather event comprising at least one of a tornado, a hurricane, a hail cloud, a heavy rain cloud, a derecho, and a downburst.

In some embodiments, there may be a device comprising one or more processors, a memory storing computer instructions that can be executed by the one or more processors such that the device is caused to perform any one or more of the methods described above, when the instructions are executed. Further, there may be a non-transitory computer-readable medium storing such instructions.

Further, there may be a device that comprises one or more processors, a memory storing instructions for the one or more processors, a communication module to connect to a remote server over a communication network, and a display. When the instructions are executed, the device may be caused to: receive, from the remote server, a time line comprising a plurality of weather forecasts and observation data associated with at least one of the plurality of weather forecasts, and cause, on the display, a display of at least a part of the time line received from the remote server. The device may be a mobile device such as, non-exclusively, a handheld device, a cellphone, a vehicle, etc.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
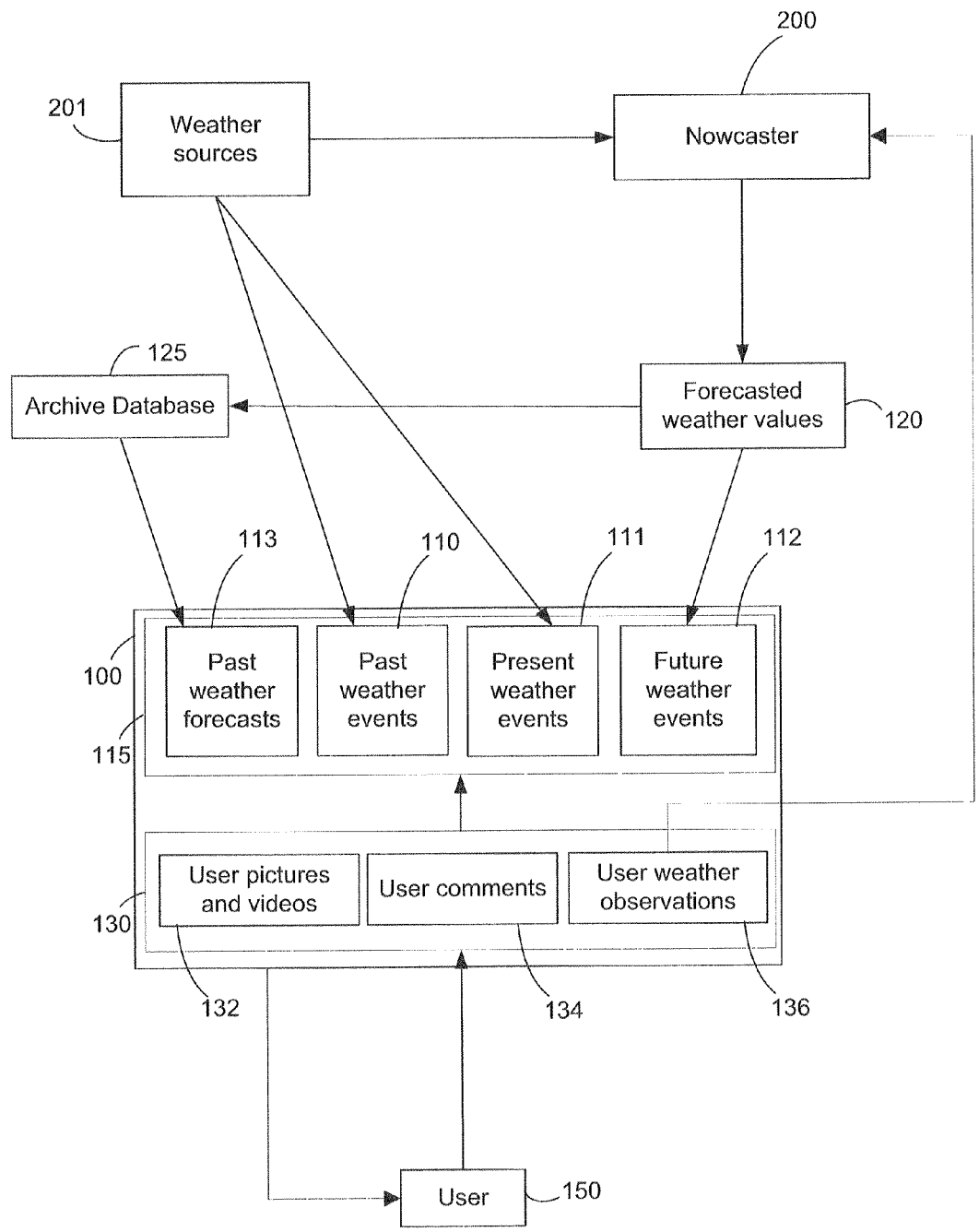
FIG. 1 is a block diagram illustrating an example of a method and system for displaying weather information on a timeline.

The embodiments will now be described more fully hereinafter with reference to the accompanying drawings, which form a part hereof, and which show, by way of illustration, specific embodiments by which the embodiments may be practiced. The embodiments are also described so that the disclosure conveys the scope of the claimed subject matter to those skilled in the art. The embodiments may, however, be embodied in many different forms and should not be construed as limited to the embodiments set forth herein.

Among other things, the present embodiments may be embodied as methods or devices. Accordingly, the embodiments may take the form of an entirely hardware embodiment, an entirely software embodiment, an embodiment combining software and hardware aspects, etc. Furthermore, although the embodiments are described with reference to a portable or handheld device, they may also be implemented on desktops, laptops, tablet devices, or any computing device having sufficient computing resources to implement the embodiments.

Definitions

In the present specification, the following terms are meant to be defined as indicated below:

Nowcasting is a contraction of "now" and "forecasting"; it refers to the sets of techniques devised to make short-term forecasts, typically in the 0 to 12 hour range.

A nowcaster is a weather forecasting device which prepares very short-term (e.g., one minute, five minutes, 15 minutes, 30 minutes, etc.) forecasts for a given territory, which is a very small region on Earth (5 meters, 10 meters, 50 meters, 100 meters, 500 meters, 1,000 meters, etc.).

A weather value is a weather related quantity or attribute of any sort, such as temperature, pressure, visibility, precipitation type and intensity, accumulation, cloud cover, wind, etc.

A forecasted weather value is a weather value that is predicted by the nowcaster.

A weather-related event is, for example, at least one event of hail, a wind gust, lightning, a temperature change, etc.

Precipitation type (PType) indicates the type of precipitation. Examples of precipitation types include, but are not limited to, rain, snow, hail, freezing rain, ice pellets, ice crystals, etc.

Precipitation rate (PRate) indicates the precipitation intensity. Examples of precipitation rate values include, but are not limited to, no (i.e., none), light, moderate, heavy, extreme. In an embodiment, the precipitation rate can also be expressed as a range of values such as: none to light, light to moderate, moderate to heavy, or any combination of the above.

Precipitation probability indicates the probability that precipitation might occur. Examples of precipitation probability values include, but are not limited to, no, unlikely, slight chance of, chance of, likely, very likely, and certain, etc.

In an embodiment, the precipitation probability can also be expressed as a range of values such as: none to light, light to moderate, moderate to heavy. Precipitation probability may also be expressed in terms of percentages; e.g., 0%, 25%, 50%, 75%, 100%, etc.; or ranges of percentages; e.g., 0% to 25%, 25% to 50%, 50% to 75%, 75% to 100%, etc. In an embodiment, the precipitation probability may be taken from a probability distribution.

Precipitation type and precipitation rate categories (PTypeRate): a PTypeRate category is combination of precipitation type and precipitation rate to which may be associated a probability of occurrence for a given period to indicate the possibility of receiving a certain type of precipitation at a certain rate.

A weather forecast is a set of one or more forecasted weather values that are displayable to users.

A user is a person to whom or a machine to which a weather forecast is forwarded.

A weather event is any measured or forecasted weather value, weather forecast or weather source.

Briefly stated, the present embodiments describe a computer-implemented method and system for displaying weather information on a timeline. The weather forecast is generated by a short-term weather forecaster known as system for generating nowcasts or nowcaster.

Displaying Weather Information on a Timeline

FIG. 1 illustrates a method and system for displaying weather information using a timeline generator 100.

Figure 6:
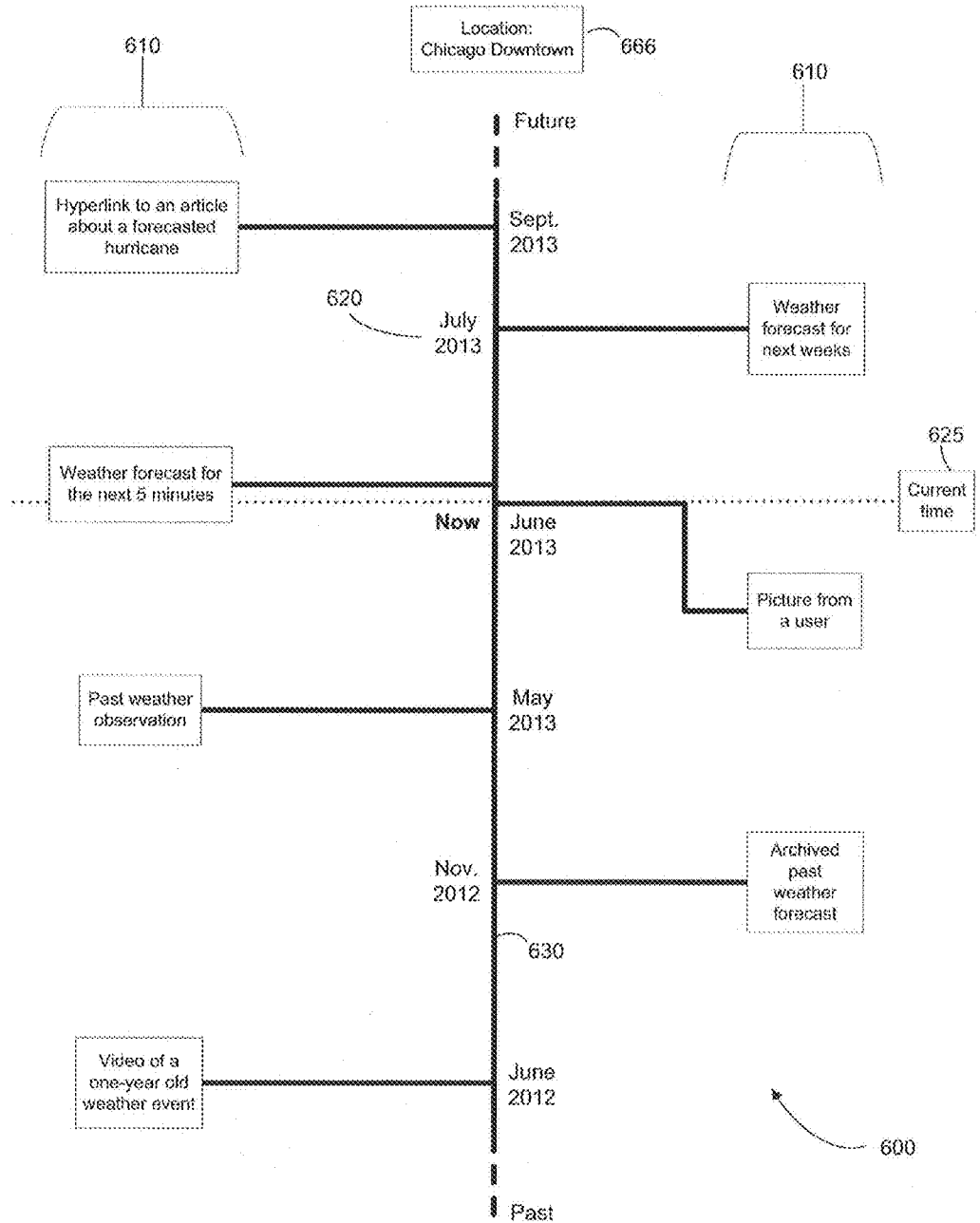
FIG. 6 is a block diagram illustrating an example of a timeline displaying examples of weather information in one location, according to an embodiment.

According to an embodiment, the nowcaster 200 may be used to prepare nowcasts that may be displayed on the timeline 600 illustrated in FIG. 6 using the timeline generator 100. More precisely, the nowcaster 200 uses weather sources 201 to prepare forecasted weather values 120. The weather sources 201 may be categorized as past weather observations and present weather observations. The past weather observations may include archived weather observations.

The timeline generator 100 uses weather events 115, which comprise at least one of the following: past weather events 110, present weather events 111, and future weather events 112. For past weather events 110 and present weather events 111, the weather sources 201 may be used directly. Since weather sources 201 may comprise elements like measured weather values (such as temperature, precipitation type and rate, pressure, weather radars and satellite observations, weather pictures and videos, and other weather sources as detailed in FIG. 2B, it is possible to display such elements to represent past weather events 110 and present weather events 111 on the timeline 600 using the timeline generator 100.

Future weather events 112 may be taken into account by the timeline generator 100 by using the forecasted weather values 120. According to an embodiment, the forecast of weather events or weather values may be depicted by predefined pictures or videos.

According to an embodiment, the forecasted weather values 120 may be stored in an archive database 125. This archive database 125 may serve as a basis for including past weather forecasts 113 among the weather events 115 in the timeline generator 100.

Once the timeline generator 100 has everything it needs to operate, it sends the timeline 600 to the user 150. According to an embodiment, this sending occurs through a communication network 254.

According to an embodiment, there may be collaboration from the users 150 to improve the timeline 600 by sending information to the timeline generator 100. The timeline generator 100 may comprise incorporating the user input 130 to the timeline 600. For example, the user input 130 may comprise user picture or video 132, a user comment 134, or a user weather observation 136. A user weather observation 136 may be a fact about the weather that helps to confirm or correct the weather events 115 displayed in the timeline 600, such as a light rain at a specific location. In that case, the user weather observations 136 may be sent to the nowcaster 200 as additional input information for nowcasting. A user weather observation 136 may also be an interesting fact such as the presence of a tornado or a lightning, which could be incorporated directly in the present weather events 111 or the future weather events 112 as weather emergencies that can be tracked. If dangerous or interesting weather events are tracked, an alert could be sent to the user 150 via the timeline generator 100.

If the collaboration is used in the method, the additions made by the user 150 to the timeline generator 100 are incorporated into the timeline 600 that is displayed to the other users, so it is possible for one user 150 to see the pictures, comments, or other user input 130 of other users. Optionally, the user 150 could choose to have a timeline generator 100 that works specifically for a given city or region, or for the current location, or over an area around this location with a given radius and to follow a given weather event, as described hereinbelow.

Figure 3A:
FIG. 3A is a screenshot illustrating an example of a user interface on which weather information is displayed on various timelines, according to an embodiment.
Figure 3B:
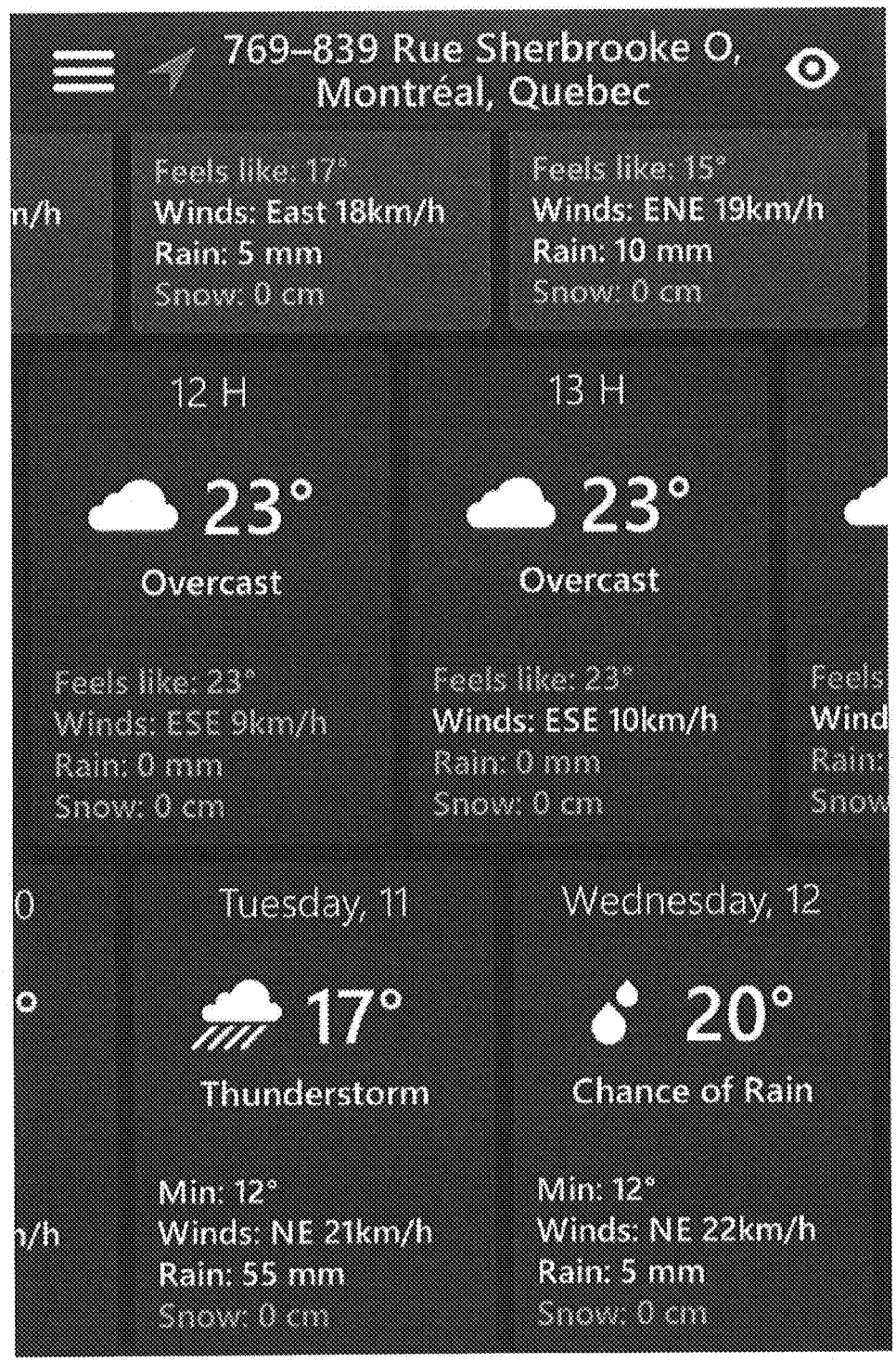
FIG. 3B is a screenshot illustrating an example of a user interface on which weather information is displayed on various timelines with which the user may interact independently, according to an embodiment.

FIGS. 3A and 3B illustrate embodiments of the user interface comprising the display of the timeline 600. As seen on FIG. 3A, there may be a plurality of timelines, each one with its own first time and its own time increment. FIG. 3B shows that a user 150 may interact with these timelines independently, going forward or backward on a timeline, one timeline at a time.

FIG. 6 is a block diagram illustrating another embodiment of the display of the timeline 600, including the display of various examples of weather information 610 for the location 666. The weather information 610 may comprise a succession of weather forecasts prepared by the nowcaster 200 which form the basis of the future weather events 112 or of the past weather forecasts 113, user input 130 as described hereinabove, or weather sources 201 categorized in either present weather observations or past weather observations.

According to the embodiment presented in FIG. 6, the timeline may include weather information 610 relating to the times before, after or at a given time 625 at which the user 150 views the timeline 600. The given time 625 may be a current time. The user 150 may also scroll down on the timeline to view older weather information until the oldest weather information is reached, and scroll up to view future weather events 112 until there is no further future weather event.

The weather information 610 that is displayed may be pinned on the time axis 630. The pinned weather information 610 may appear with a corresponding display time 620.

Figure 7:
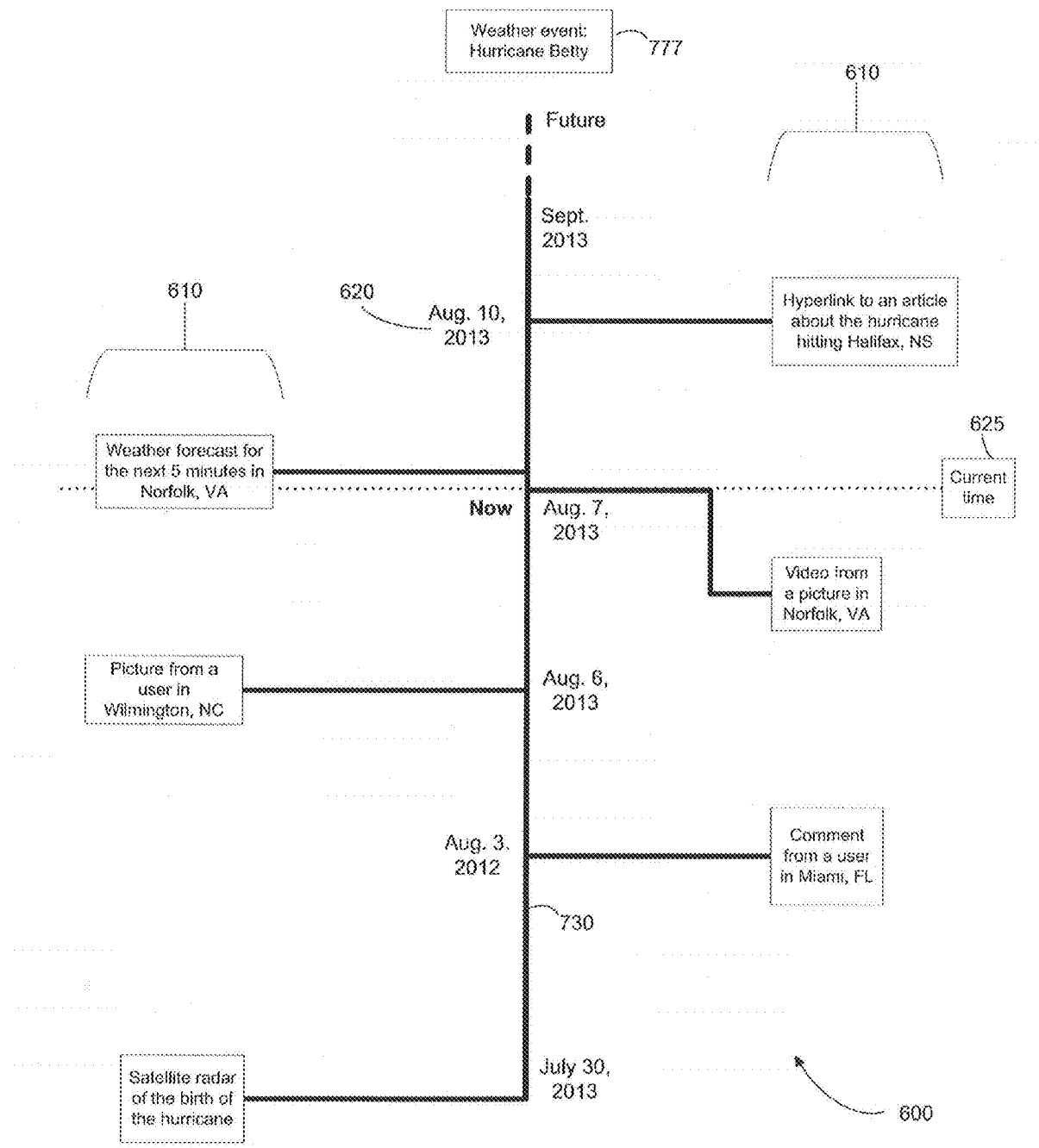
FIG. 7 is a block diagram illustrating an example of a timeline displaying examples of weather information relating to a weather event, according to an embodiment.

FIG. 7 is a block diagram illustrating another embodiment of the display of the timeline 600, including the display of various examples of weather information 610 for the weather event 777. Since the timeline 600 displays weather information 610 about a weather event 777, the timeline 600 may relate to more than one location. The followed weather event 777 may be any event related to precipitation, temperature or wind, such as a tornado, a hurricane, a hail or a wind storm, a derecho storm, a downburst, etc. The weather information 610 may comprise a succession of weather forecasts prepared by the nowcaster 200 and which form the basis of the future weather events 112 or of the past weather forecasts 113, user input 130 as described hereinabove, or weather sources 201 categorized in either present weather observations or past weather observations.

According to the embodiment presented in FIG. 7, the timeline may include weather information relating to the times before, after or at a given time 625 at which the user 150 views the timeline 600. The given time 625 may be a current time. The user 150 may also scroll down on the timeline to view older weather information until the oldest weather information is reached, which corresponds to the birth of the weather event, and scroll up to view future weather events 112 until there is no further future weather event.

The weather information 610 that is displayed may be pinned on the time axis 630. The pinned weather information 610 may appear with a corresponding display time 620.

Nowcaster

Figure 2A:
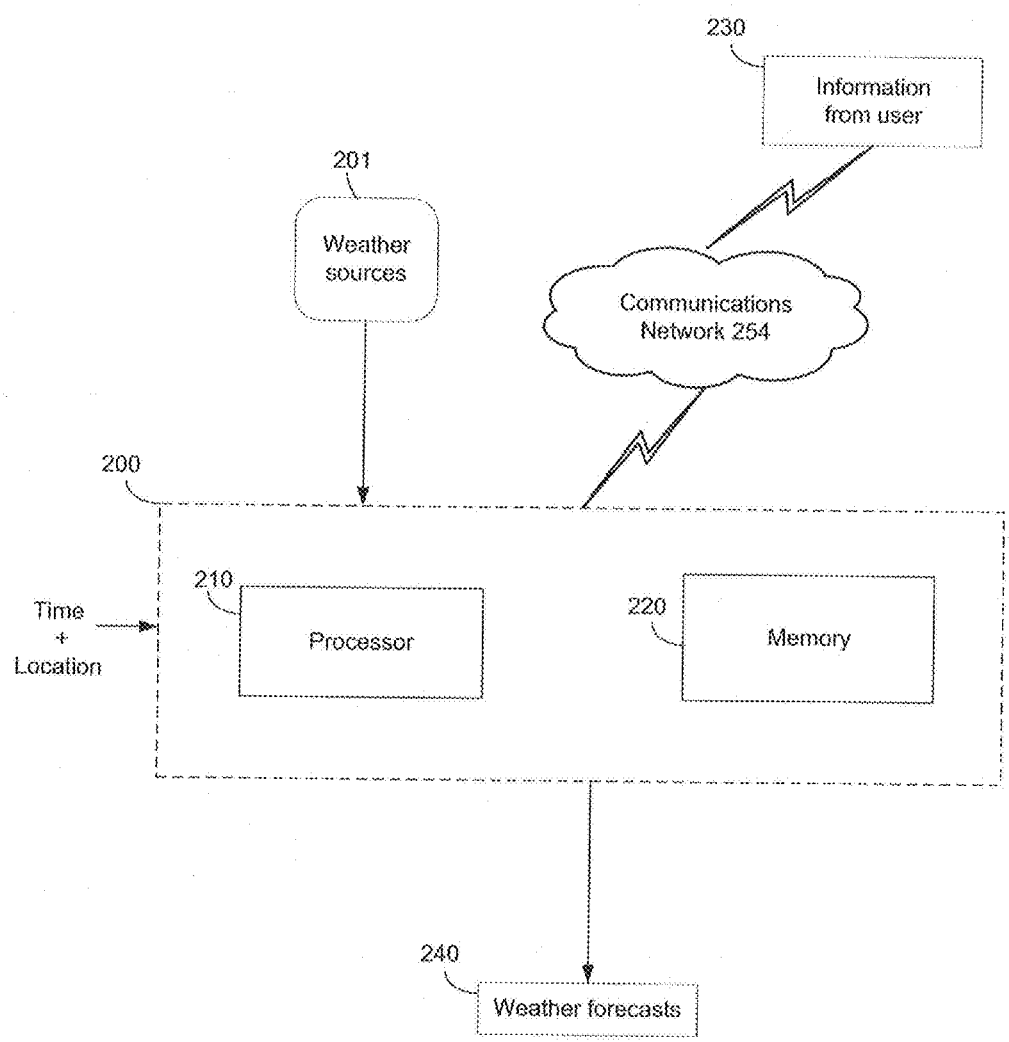
FIG. 2A is a block diagram showing an example of a suitable nowcaster for implementing the embodiments.
Figure 2B:
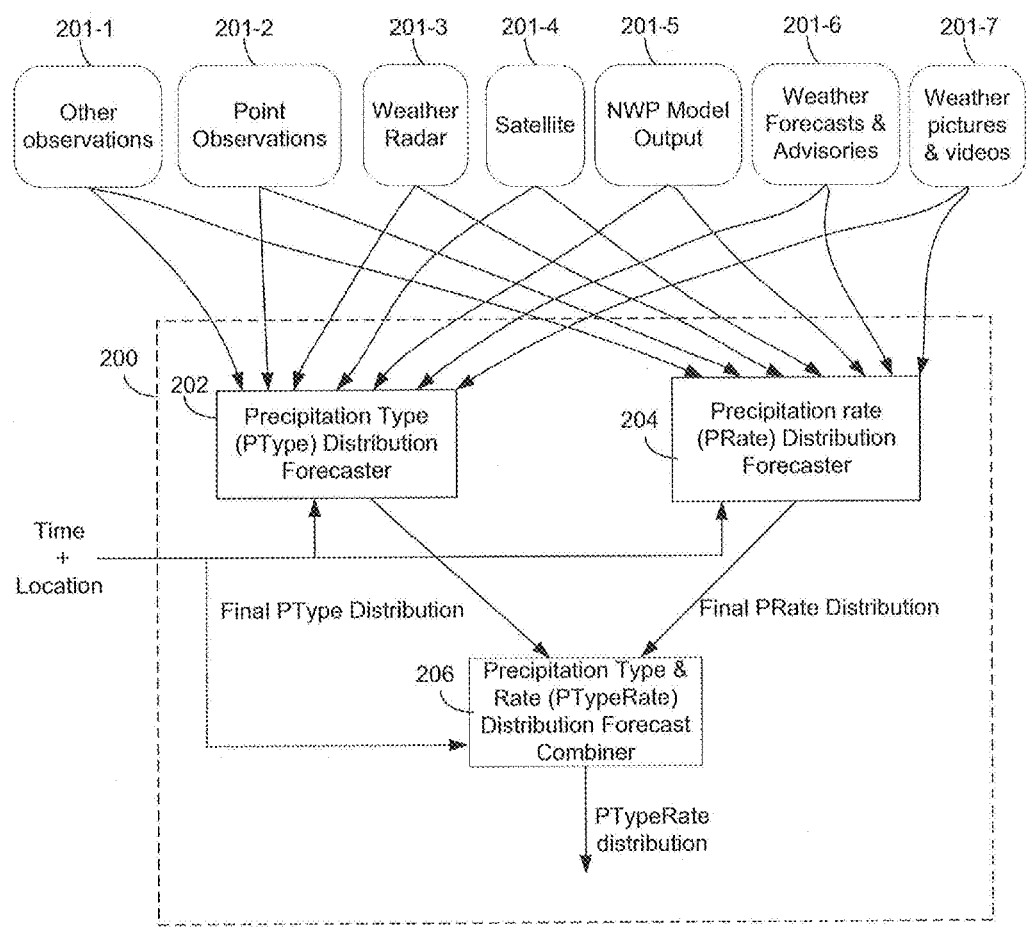
FIG. 2B is a more detailed block diagram showing an example of a suitable nowcaster for implementing the embodiments.
Figure 2C:
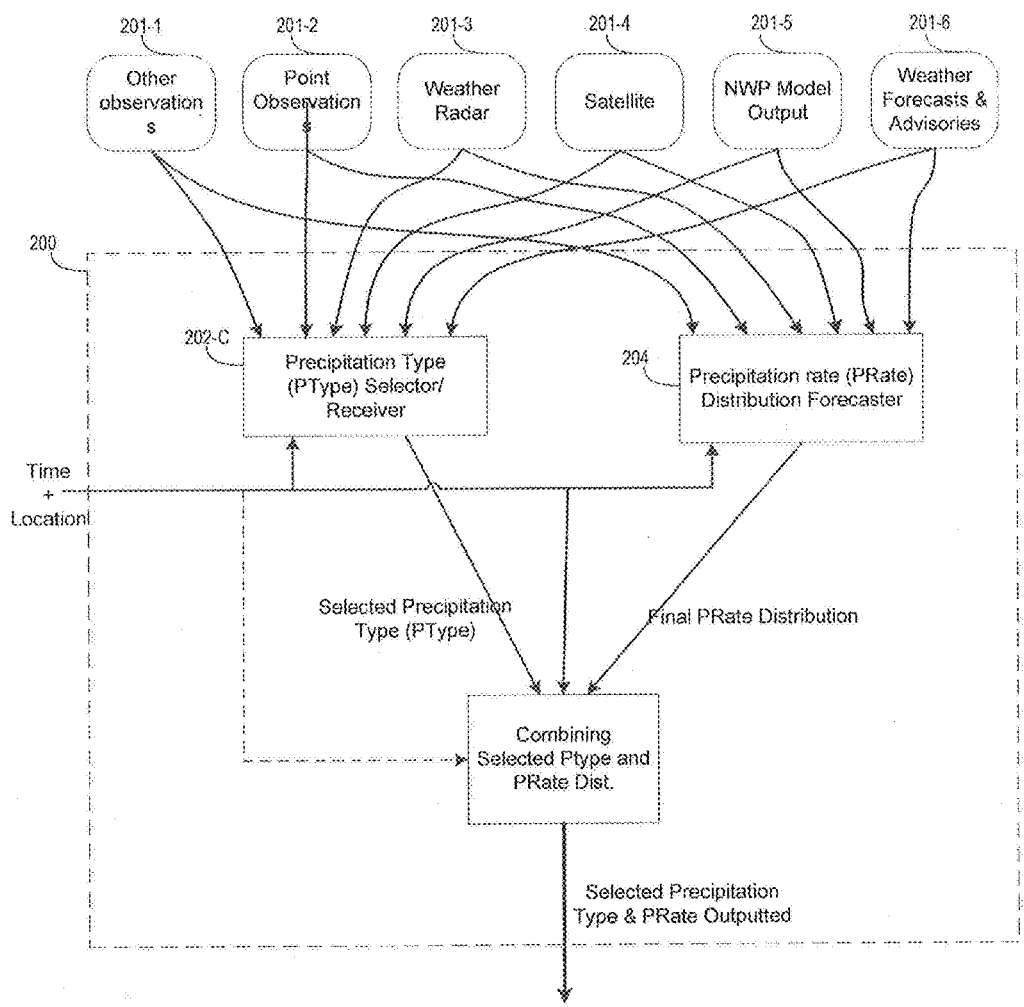
FIG. 2C is a more detailed block diagram showing another example of a suitable nowcaster for implementing the embodiments.

FIGS. 2A-2C are block diagrams of a nowcaster according to one or more embodiments of the subject matter described in the specification.

As shown in FIGS. 2A-2C, the nowcaster 200 receives weather observations from different sources 201, such as weather observation sources, including but not limited to, point observations 201-2 (e.g., feedback provided by users and automated stations), weather radars 201-3, satellites 201-4 and other types of weather observations 201-1, and weather forecast sources such as numerical weather prediction (NWP) model output 201-5 and weather forecasts and advisories 201-6.

The nowcaster 200 comprises a memory 220 and a processor 210. The memory 220 comprises the instructions for the method and also stores data from the weather sources 201, intermediate results and weather forecasts. The processor 210 allows the nowcaster 200 to perform calculations.

The nowcaster 200 can receive information 230 from a user 150 through a communication network 254.

The nowcaster 200 outputs a weather forecast or a succession of weather forecasts.

FIG. 2B is one embodiment of the nowcaster 200. In this embodiment, the nowcaster 200 comprises a PType distribution forecaster 202 and a PRate distribution forecaster 204. The PType distribution forecaster 202 receives the weather observations from the different weather sources 201 and outputs a probability distribution of precipitation type over an interval of time, for a given latitude and longitude (and/or location). For example:
  a. Snow: 10%
  b. Rain: 30%
  c. Freezing Rain: 60%
  d. Hail: 0%
  e. Ice Pellets: 0%

Similarly, the PRate forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
  f. No Precip.: 30%
  g. Light: 40%
  h. Moderate: 20%
  i. Heavy: 10%

The PRate and PType values output by the PRate forecaster 204 and the PType forecaster 202 are sent to a forecast combiner 206 to combine these values into a single value PTypeRate which represents the precipitation outcomes. For example, if the value of PType is "Snow", and the value of "PRate" is heavy, the combined value of PTypeRate may be "heavy snow".

For a given latitude and longitude, the system outputs forecasted PTypeRate Distributions for predefined time intervals, either fixed (ex: 1 minute) or variable (e.g., one minute, five minutes, then 10 minutes, etc.). The system can either pre-calculate and store forecasted PTypeRate Distributions in a sequence of time intervals, or calculate then on the fly. A PTypeRate Distribution represents, for each time interval, the certainty or uncertainty that a PTypeRate will occur.

With reference to FIG. 2B, the forecast combiner 206 receives the final PRate distribution from the PType forecaster 202 and the final PRate distribution from the PRate forecaster 204 to combine them into a group of PTypeRate distribution values each representing the probability of receiving a certain type of precipitation at a certain rate. An example is provided below.

Assuming that the PType distribution is as follows: Snow: 50%, Rain 0%, Freezing rain: 30%, Hail: 0%, Ice pellets: 20%, and the PRate distribution is as follows: None: 0%, Light: 10%, Moderate: 20%, Heavy: 30%, Very heavy: 40%, the PTypeRate distributions may be as follows:

TABLE 1

An Example of PTypeRate Distribution Table

| PRate | PType | | | | |
|---|---|---|---|---|---|
| | Snow 50% | Rain 0% | Freez. Rain 30% | Hail 0% | Ice Pellets 20% |
| None 0% | No precipitation | No precipitation | No precipitation | No precipitation | No precipitation |
| Light 10% | 5% light snow | No precipitation | 3% light freezing rain | No precipitation | 2% light ice pellets |
| Moderate 20% | 10% moderate snow | No precipitation | 6% moderate freezing rain | No precipitation | 4% moderate ice pellets |
| Heavy 30% | 15% heavy snow | No precipitation | 9% heavy freezing rain | No precipitation | 6% heavy ice pellets |
| Very Heavy 40% | 20% very heavy snow | No precipitation | 12% very heavy freezing rain | No precipitation | 8% very heavy ice pellets |

Accordingly, the forecast combiner 206 multiplies the probability of each type of precipitation by the probability of each rate of precipitation to obtain a probability of receiving a certain type of precipitation at a certain rate, for example, 20% chance of heavy snow, or 12% chance of very heavy freezing rain. In an embodiment, it is possible to associate probability ranges with textual information for displaying the textual information to a user instead of the probabilities in numbers. For example, probabilities that are between 5% and 15% may be associated with the text: "low chance," while probabilities that are between 40% and 70% may be associated with the text "high chance," or "very likely," etc. whereby, instead of displaying: "60% chance of heavy snow," it is possible to display: "high chance of heavy snow".

In another embodiment, it is possible to combine two or more different PTypeRates along one or more dimensions (the dimensions including: the rate, type, or probability). For example, results of such combination may include: Likely light to moderate rain; Likely light to moderate rain or heavy snow; Likely moderate rain or snow; Likely rain or snow; Chance of light to moderate rain or heavy snow or light hail; Chance of moderate rain, snow or hail; Chance of rain, snow or hail, etc.

Accordingly, the nowcaster 200 receives the location for which the nowcasts are needed and the time and/or time interval for which the nowcasts are needed and outputs the PTypeRate distribution for the given location and for the specific time.

FIG. 2C illustrates another embodiment of the nowcaster 200. In this embodiment, the nowcaster 200 comprises a PType selector/receiver 202-C and a PRate distribution forecaster 204.

Similar to the embodiment shown in FIG. 2B, the PRate distribution forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
  f. No Precip.: 30%
  g. Light: 40% h. Moderate: 20%
i. Heavy: 10%

However, the PType selector/receiver 202-C does not output a probability distribution associated with different types of precipitation. Instead, the PType selector/receiver 202-C receives weather observations for a given latitude and longitude from the different sources 201 to select one precipitation type from a list of different precipitation types. For example, based on the inputs received from the sources 201, the PType selector/receiver 202-C selects a single precipitation type that is most likely to occur in the given latitude and the longitude (and/or location) from the following list of precipitation types:

a. Snow
b. Rain
c. Freezing Rain
d. Hail
e. Ice Pellets
f. Mix (e.g., a+c, a+d, b+c, a+e, c+e, d+e, etc.)

From the list of precipitation types, such as the one above, only one precipitation type is selected for a given location. For example, a mix of snow and freezing rain can be selected as the most likely precipitation type for a given location at a given time. The precipitation type is not associated with a probability value. In fact, since only one precipitation type is selected for any given location and time corresponding to the location, the selected precipitation type will have the effective probability value of 100%.

The list of precipitation types that are available for selection of one type may include a mix type that represent a mix of two different precipitation types (e.g., snow and freezing rain, hail and ice pellets, etc). A mix type is considered as a distinct precipitation type available for selection, and as shown above in type (f), there can be many different mix types representing the mix of different pairs of various precipitation types.

In another embodiment, the precipitation type is not selected by the PType selector/receiver 202-C but instead is received from a source outside the nowcaster 200. In other words, the nowcaster 200 may send a request to a remote source (e.g., a third-party weather service) for identification of the precipitation type that is most likely to occur at a given location at a given time and receive a response from the source identifying the most likely precipitation type. In this case, selection of the precipitation type is not performed by the nowcaster 200. The already-selected precipitation type is merely inputted to the nowcaster 200, and consequently it may save computational power of the nowcaster 200 that would otherwise have been needed to perform the selection.

The selected precipitation type and the PRate values respectively output by the PType selector/receiver 202-C and the PRate distribution forecaster 204 are combined. For example, if the selected precipitation type is snow, and the PRate values are as described above, the combined information would indicate:

a. No Snow: 30%
b. Light Snow: 40%
c. Moderate Snow: 20%
d. Heavy Snow: 10%.

As only one precipitation type is concerned, only minimal amount of computational power is needed to perform the combining to output the final weather forecast data. Since the PType selector/receiver 202-C will output one precipitation type for a given location and time, if the PRate distribution forecaster 204 outputs a number m of probability distribution, the final weather forecast data will comprise only a number m (m*1) of weather forecast distribution.

In outputting the final weather forecast data, it is possible to associate probability ranges with textual information for displaying the textual information to the user instead of the probabilities in numbers, similar to the embodiment shown in FIG. 2B. For example, probabilities that are between 5% and 15% may be associated with the text: "low chance," while probabilities that are between 40% and 70% may be associated with the text "high chance," or "very likely," etc. whereby, instead of displaying: "60% chance of heavy snow," it is possible to display: "high chance of heavy snow".

Accordingly, the nowcaster 200 receives the location for which the nowcasts are needed and the time and/or time interval for which the nowcasts are needed and outputs the selected PType and PRate distribution for the given location and for the specific time.

The nowcaster 200 according to the embodiment shown in FIG. 2C may be advantageous over the embodiment shown in FIG. 2B in certain circumstances in which efficiency is desired. The embodiment of FIG. 2C can be implemented using much less processing power than the embodiment of FIG. 2B. However, the embodiment of FIG. 2B may be more suitable than the embodiment of FIG. 2C in providing more detailed and accurate snapshots of weather forecast data for any given location and time.

Figure 4:
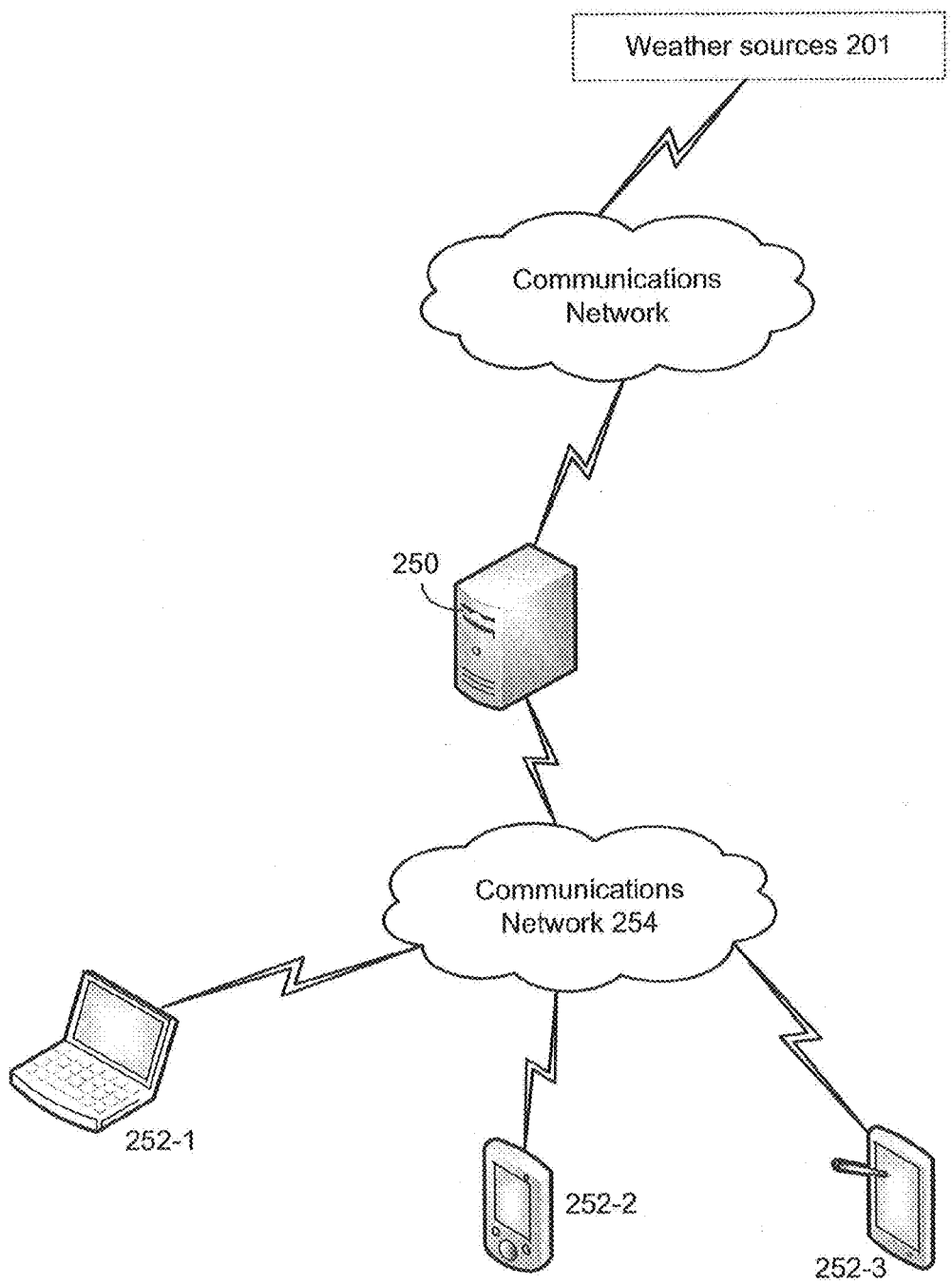
FIG. 4 is an example of a network environment in which the embodiments may be practiced.

FIG. 4 is an example of a network environment in which the embodiments may be practiced. The nowcaster 200 may be implemented on a server 250 which is accessible by a plurality of client computers 252 over a communication network 254. The client computers 252 may include, but are not limited to, laptops, desktops, portable computing devices, tablets and the like. Using a client computer 252, each user 150 may view the displayed forecasted weather values. The server accesses weather sources 201 over a communication network 254 as discussed in connection with FIGS. 2B and 2C. The server 250 may have map data stored thereon.

Hardware and Operating Environment

Figure 5:
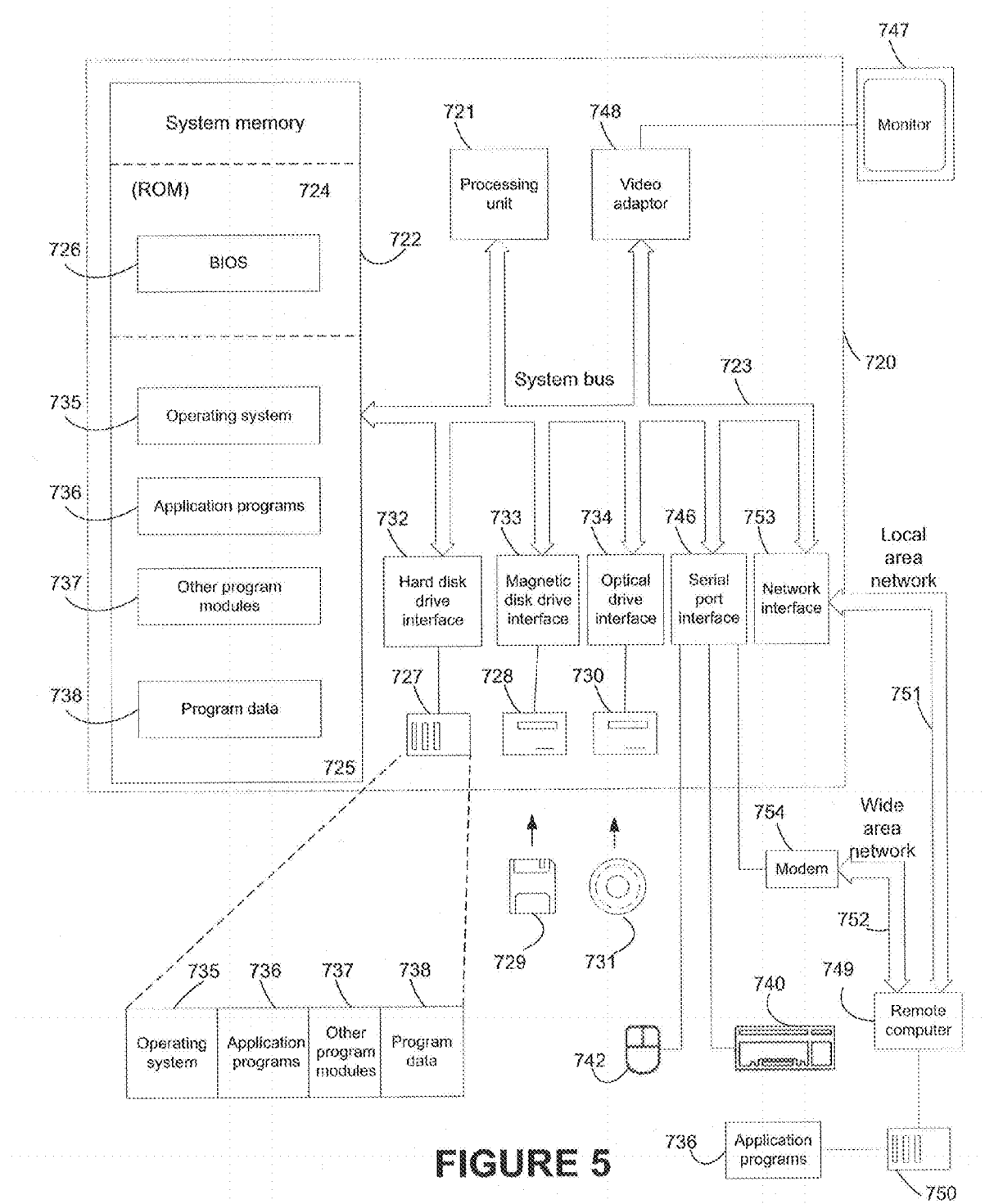
FIG. 5 is an exemplary diagram illustrating a suitable computing operating environment in which embodiments of the claimed subject matter may be practiced.

FIG. 5 illustrates an exemplary diagram of a suitable computing operating environment in which embodiments of the claimed subject matter may be practiced. The following description is associated with FIG. 5 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a hand-held or palm-size computer, smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, cellular telephones, smartphones, display pagers, radio frequency (RF) devices, infrared (IR) devices, Personal Digital Assistants (PDAs), laptop computers, wearable computers, tablet computers, a device of the iPod or iPad family of devices, integrated devices combining one or more of the preceding devices, or any other computing device capable of performing the methods and systems described herein. The embodiments may also be practiced in distributed computing environments wherein tasks are performed by remote processing devices that are linked through a communications network. In a distributed computing environment, program modules may be located in both local and remote memory storage devices.

The exemplary hardware and operating environment of FIG. 5 includes a general purpose computing device in the form of a computer 720, including a processing unit 721, a system memory 722, and a system bus 723 that operatively couples various system components including the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. In one embodiment of the claimed subject matter, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. In alternative embodiments of the claimed subject matter, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the claimed subject matter, the hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 740 and pointing device 742. Other input devices (not shown) may include a microphone, joystick, game pad, satellite dish, scanner, touch sensitive pad, or the like. These and other input devices are often connected to the processing unit 721 through a serial port interface 746 that is coupled to the system bus, but may be connected by other interfaces, such as a parallel port, game port, or a universal serial bus (USB). In addition, input to the system may be provided by a microphone to receive audio input.

A monitor 747 or other type of display device is also connected to the system bus 723 via an interface, such as a video adapter 748. In one embodiment of the claimed subject matter, the monitor comprises a Liquid Crystal Display (LCD). In addition to the monitor, computers typically include other peripheral output devices (not shown), such as speakers and printers. The monitor may include a touch sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiment is not limited to a particular type of communications device. The remote computer 749 may be another computer, a server, a router, a network PC, a client, a peer device or other common network node, and typically includes many or all of the elements described above relative to the computer 720, although only a memory storage device 750 has been illustrated in FIG. 6. The logical connections depicted in FIG. 6 include a local-area network (LAN) 751 and a wide-area network (WAN) 752. Such networking environments are commonplace in offices, enterprise-wide computer networks, intranets and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

The hardware and operating environment in conjunction with which embodiments of the claimed subject matter may be practiced has been described. The computer in conjunction with which embodiments of the claimed subject matter may be practiced may be a conventional computer a handheld or palm-size computer, a computer in an embedded system, a distributed computer, or any other type of computer; the claimed subject matter is not so limited. Such a computer typically includes one or more processing units as its processor, and a computer-readable medium such as a memory. The computer may also include a communications device such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer-implemented method, comprising:
identifying first weather information associated with a first time, a first location, and a first weather event;
identifying second weather information associated with a second time;
generating, based on weather data, third weather information associated with a third time, a second location, and the first weather event, wherein generating the third weather information includes;
identifying plurality of rate probabilities, each rate probability of the plurality of rate probabilities indicating a likelihood that a corresponding rate of precipitation will occur at the third time at the second location;
identifying a plurality of type probabilities; each type probability of the plurality of type probabilities indicating a likelihood that a corresponding type of a precipitation will occur at the third time at the second location; and
generating a plurality of result probabilities by multiplying the plurality of rate probabilities by the plurality of type probabilities; each result probability of the plurality of result probabilities indicating a likelihood that a corresponding precipitation type will occur at a corresponding rate at the third time at the second location;
receiving observation data from a mobile user device, the observation data related to the first weather event at the first location at the first time;
generating a first timeline comprising the observation data and information indicative of the first weather information, the second weather information, and the third weather information; and
transmitting the first timeline to other user devices.

2. The method of claim 1, wherein the first time is a past time, the second time is a current time, and the third time is a future time.

3. The method of claim 1, wherein at least one of the first weather information, the second weather information, or the third weather information comprises a forecasted weather value indicative of a probability of having a first type of precipitation in the first location with a first intensity.

4. The method of claim 1, wherein the second weather information is related to the first location.

5. The method of claim 1, wherein the second weather information is related to the first weather event.

6. The method of claim 1, wherein the first weather information, the second weather information, and the third weather information are related to a first user.

7. The method of claim 1, wherein the observation data is at least one of:
a picture depicting the first weather event in the first location at the first time;
a video depicting the first weather event in the first location at the first time; or
a comment describing the first weather event in the first location at the first time.

8. The method of claim 1, further comprising:
generating a second timeline comprising information indicative of weather information associated with a fourth time and a fifth time.

9. The method of claim 8, wherein the first timeline is associated with the first location and the second timeline is associated with a second location different from the first location.

10. The method of claim 8, wherein the first timeline is associated with the first weather event and the second timeline is associated with a second weather event different from the first weather event.

11. The method of claim 8, wherein the first timeline is associated with a first user, the second timeline is associated with a second user different from the first user, and at least a portion of the observation data is received from the first and second users.

12. The method of claim 1, wherein the observation data is related to a weather event comprising at least one of a tornado, a hurricane, a hail cloud, a heavy rain, a heavy snow, a derecho, or a downburst.

13. A device for generating a weather timeline, comprising:
one or more processors;
a memory that stores instructions for the one or more processors; and
a communication module to connect to a remote user device via a communication network,
wherein when the one or more processors execute the instructions stored in the memory, the device is caused to:
identify first weather information associated with a first time, a first location, and a first weather event;
identify second weather information associated with a second time;
generate, based on weather data, third weather information associated with a third time, a second location, and the first weather event, wherein generating the third weather information includes:
identifying plurality of rate probabilities, each rate probability of the plurality of rate probabilities indicating a likelihood that a corresponding rate of precipitation will occur at the third at the second location;
identifying a plurality of type probabilities, each type probability of the plurality of type probabilities indicating a likelihood that a corresponding type of a precipitation will occur at the third time at the second location; and
generating a plurality of result probabilities by multiplying the plurality of rate probabilities by the plurality of type probabilities, each result probability of the plurality of result probabilities indicating a likelihood that a corresponding precipitation type will occur at a corresponding rate at the third time at the second location;
receive observation data from a user device, the observation data related to the first weather event at the first location at the first time;
generate a first timeline comprising the observation data and information indicative of the first weather information, the second weather information, and the third weather information; and
transmit the first timeline to the remote user device for display on a display device.

14. The device of claim 13, wherein the first time is a past time, the second time is a current time, and the third time is a future time.

15. The device of claim 13, wherein at least one of the first weather information, the second weather information, and the third weather information comprises a forecasted weather value indicative of a probability of having a first type of precipitation in the first location with a first intensity.

16. The device of claim 13, wherein the second weather information is related to the first location.

17. The device of claim 13, wherein the second weather information is related to the first weather event that is associated with at least a precipitation type, a temperature level or a wind intensity.

18. The device of claim 13, wherein the first weather information, the second weather information, and the third weather information are related to a first user and at least a portion of the observation data is received from the first user.

19. The device of claim 13, wherein the observation data comprises at least one of:
   a picture depicting the first weather event in the first location at the first time;
   a video depicting the first weather event in the first location at the first time; or
   a comment describing the first weather event in the first location at the first time.

20. The device of claim 13, wherein the device is caused to generate a second timeline for display on the display device with the first timeline, the second timeline comprising information indicative of weather information associated with a fourth time and a fifth time.

21. A system comprising a server and a remote device that is connected over a communication network, wherein:
   the server comprises a computer and a non-transitory computer readable medium that stores a program causing the computer to execute a timeline generation process, the timeline generation process comprising:
      identifying first weather information associated with a first time, a first location, and a first weather event;
      identifying second weather information associated with a second time,
      generate, based on weather data, third weather information associated with a third time, a second location, and the first weather event, wherein generating the third weather information includes:
         identifying plurality of rate probabilities, each rate probability of the plurality of rate probabilities indicating a likelihood that a corresponding rate of precipitation will occur at the third time at the second location;
         identifying a plurality of type probabilities, each type probability of the plurality of type probabilities indicating a likelihood that a corresponding type of a precipitation will occur at the third time at the second location; and
         generating a plurality of result probabilities by multiplying the plurality of rate probabilities by the plurality of type probabilities, each result probability of the plurality of result probabilities indicating a likelihood that a corresponding precipitation type will occur at a corresponding rate at the third time at the second location;
      receiving observation data from a user device, the observation data related to the first weather event at the first location at the first time; and
      generating, for display on a display device, a first timeline comprising the observation data and information indicative of the first weather information, the second weather information, and the third weather information; and
   the remote device comprising one or more processors, a display, and a non-transitory memory storing a program causing the one or more processors to execute a process comprising:
      obtaining the first timeline from the server via the communication network;
      displaying at least a part of the first timeline on the display.

22. The computer-implemented method of claim 1, wherein the third weather information is generated based further on the observation data.

* * * * *